Feb. 23, 1965 T. E. DAVIES 3,170,681
APPARATUS FOR SCALE FREE HEATING OF METALS
Filed June 24, 1963
FIG.1.
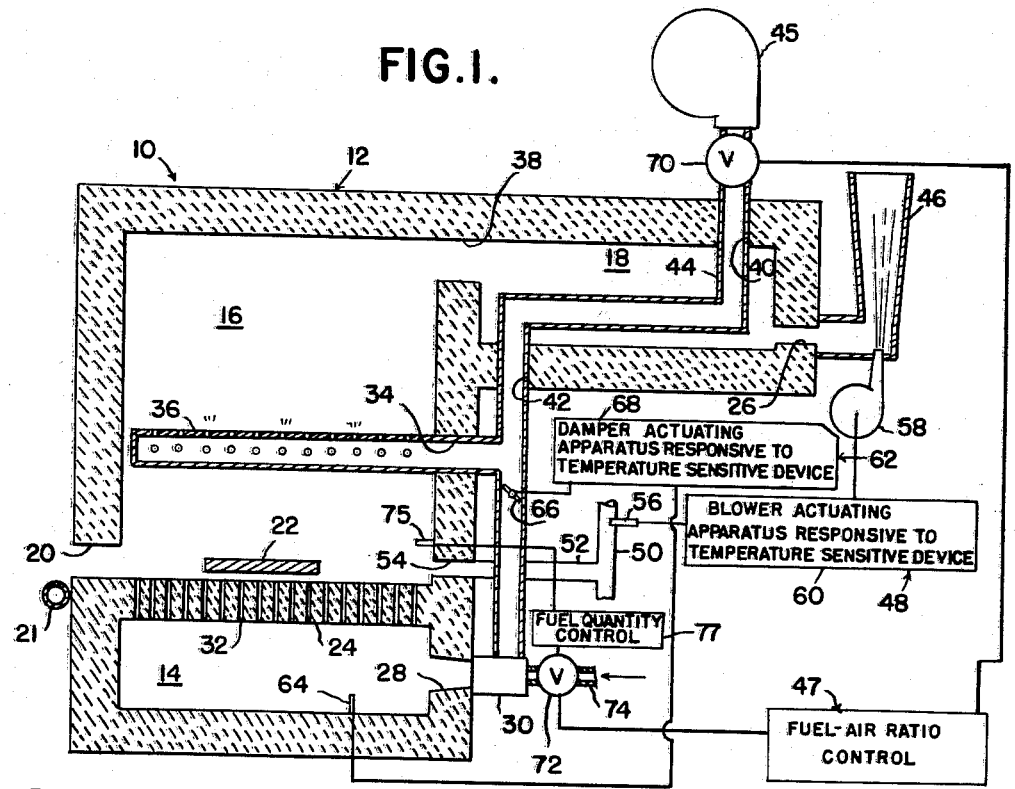
FIG.2.
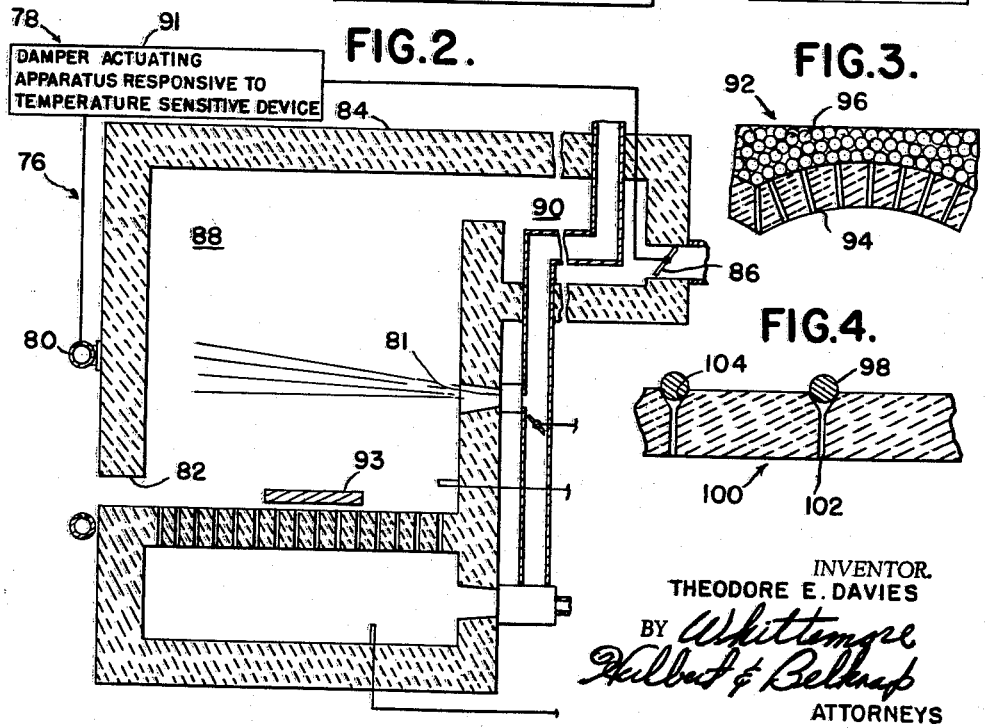
FIG.3.
FIG.4.
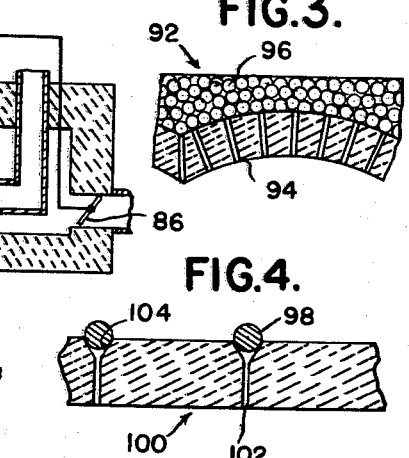
INVENTOR.
THEODORE E. DAVIES
BY Whittemore
Hulbert & Belknap
ATTORNEYS

United States Patent Office 3,170,681
Patented Feb. 23, 1965

3,170,681
APPARATUS FOR SCALE FREE HEATING OF METALS
Theodore E. Davies, Grosse Ile, Mich., assignor to The North American Manufacturing Company, Cleveland, Ohio, a corporation of Ohio
Filed June 24, 1963, Ser. No. 289,876
12 Claims. (Cl. 263—40)

The invention relates to heating of materials in a non-oxidizing atmosphere and refers more specifically to an improved structure for scale free heating of metals.

In the past heating of materials in a non-oxidizing atmosphere has been accomplished through the use of muffles, independent gas generators and the like. The prior heating processes and structures have produced relatively slow heating of material and have been particularly inefficient with regard to fuel consumption. In addition apparatus provided in the past for maintaining pressures and temperatures in conjunction with the heating process and structures have been complicated and often inefficient or inaccurate.

An object is to provide improved structure for heating material in a non-oxidizing atmosphere.

Another object is to provide structure for heating material, such as ferrous metal, in a non-oxidizing atmosphere comprising an enclosure having a porous hearth therein on which the material to be heated may be positioned and which separates the enclosure into a lower, primary combustion chamber and an upper, secondary combustion chamber, means for introducing fuel and air insufficient to produce complete burning of the fuel into the primary combustion chamber and means for subsequently introducing the remainder of the air necessary to complete burning of the fuel into the secondary combustion chamber.

Another object is to provide structure for heating material as set forth above including means for maintaining the pressure in the enclosure substantially equal to the pressure surrounding the enclosure.

Another object is to provide structure for heating material as set forth above and further including means for maintaining the temperature in the primary combustion chamber substantially constant by varying the ratio of the air and fuel fed thereto.

Another object is to provide improved structure for heating material in a non-oxidizing atmosphere which is simple, economical and efficient.

Other objects and features of the invention will become apparent as the description proceeds, especially when taken in conjunction with the accompanying drawings, illustrating preferred embodiments of the invention, wherein:

FIGURE 1 is a diagrammatic illustration of furnace structure constructed in accordance with the invention in which the heating process may be practiced.

FIGURE 2 is a diagrammatic illustration of a modification of the furnace structure illustrated in FIGURE 1.

FIGURES 3 and 4 are diagrammatic illustrations of modifications of the hearth portion of the furnace structure illustrated in FIGURES 1 and 2.

With particular reference to the figures of the drawing, one embodiment of the present invention will now be considered in detail.

The furnace structure 10 illustrated in FIGURE 1 comprises the enclosure 12 containing a lower, primary combustion chamber 14, an upper, secondary combustion chamber 16 and a recuperator chamber 18. The enclosure 12 is provided with an opening 20 therethrough through which material, such as ferrous metal 22 to be heated, may be introduced for positioning on the hearth 24 between the lower combustion chamber 14 and the upper combustion chamber 16. An exhaust opening 20 through which combustion gases are exhausted from the furnace 10 is provided in the recuperator chamber 18 of the enclosure 12.

The lower combustion chamber 14 is provided with an opening 28 therein through which a mixture of fuel and air from nozzle 30 is passed for combustion in the chamber 14. As shown in FIGURE 1, the upper wall of the primary combustion chamber 14 is formed by the porous hearth 24 whereby the gaseous products of the combustion of a fuel air mixture in the primary combustion chamber 14 pass upwardly through openings 32 in the porous hearth 24 around material 22 and into the secondary combustion chamber 16.

The upper or secondary combustion chamber 16 includes an opening 34 therein through which air is admitted into the secondary combustion chamber through the perforated air tube 36 of sufficient quantity to complete burning of the unburned fuel passed into the secondary combustion chamber from the primary combustion chamber 14, as will be considered subsequently. The tube 36 may be constructed of refractory or ceramic material or metal or a combination thereof and may be air or water cooled as necessary.

The secondary combustion chamber further includes the exhaust opening 38 at the top thereof whereby the products of the second combustion are passed into the recuperator chamber 18 of the enclosure 12.

Opening 20 is provided in enclosure 12 to permit placing material 22 in the structure 10 as previously indicated and is shielded by flame curtain structure 21. A flame curtain provided by structure 21 is of course optional and could be replaced by a door. Passage 54 is also provided in enclosure 12 and functions in conjunction with the pressure control apparatus 48 as will be considered subsequently.

The recuperator chamber 18 includes openings 40 and 42 therein through which an air conduit 44 is passed to provide preheating for the air supplied to the nozzle 30 and perforated air tube 36. The combustion products from the secondary combustion chamber 16 are drawn through the recuperator chamber 18 in accordance with the pressure differential between the eductor stack 46 connected to the exhaust opening 26 in the recuperator chamber 18 and the secondary combustion chamber 16.

The ratio of fuel supplied to nozzle 30 through conduit 74 and valve 72 to the air provided by blower 45 through valve 70 is determined by the fuel-air ratio control apparatus 47. Apparatus such as apparatus 47 are known and will not be considered in detail herein. Usually the apparatus 47 senses the fuel flow through valve 72 which may if desired be selected manually and regulates the valve 70 to provide sufficient air so that a desired fuel-air ratio is maintained. The quantity of fuel metered through valve 72 may be regulated by the temperature probe 75 in the primary combustion chamber 16 through a fuel quantity control 77 if desired. The fuel may be a gas or a finely divided combustible liquid, such as distillate oil or the like if desired.

The pressure in the secondary combustion chamber 16 is maintained substantially equal to the pressure surrounding the enclosure 12 by means of pressure control apparatus 48. The pressure control apparatus 48 includes a stack 50 connected by means of the conduit 52 into the enclosure 12, the temperature sensing device 56 located in stack 50, blower 58 connected to discharge into eductor stack 48 for varying the pressure in the eductor stack and apparatus 60 for controlling the blower in accordance with the temperature sensed by the temperature sensing device. The blower 58 in an actual installation may of course be eliminated and air for the eductor stack may be obtained from blower 45. The operation of the apparatus 48 will be considered in the over-all operation of the furnace structure 10.

The furnace structure 10, illustrated in FIGURE 1 is completed with the apparatus 62 for controlling the temperature in the primary combustion chamber 14. The apparatus 62 includes the temperature sensing device 64 positioned in the primary combustion chamber 14, the damper 66 in air supply conduit 44 for controlling the division of air between the nozzle 30 and perforated air tube 36 and the apparatus 68 for controlling the damper 66 in accordance with the temperature sensed by the temperature sensing device 64.

The operation of the furnace structure 10 to produce scale free heating of material such as ferrous metal 22, positioned in the furnace enclosure 12 will now be considered.

A fuel air ratio for complete combustion of fuel, such as a ratio of ten parts air to one part fuel is selected and the fuel-air ratio control 47 is adjusted so that sufficient air is metered into air supply conduit 44 from blower 45 through valve 70 positioned between the blower 45 and conduit 44 to permit complete combustion of fuel metered through valve 72 in fuel supply conduit 74 from a fuel source (not shown).

The air in conduit 44 is divided in accordance with the position of the damper 66 in the conduit. Thus part of the air necessary to completely burn the fuel from fuel supply conduit 74 passes into primary combustion chamber 14 after mixing in the nozzle 30 with the fuel. The resultant fuel air mixture is ignited in the primary combustion chamber 14.

The air supplied to the nozzle 30 is maintained between predetermined limits, such as between forty and sixty percent of the air necessary to completely burn the fuel supplied through fuel supply conduit 74. Thus the combustion gases produced in primary combustion chamber 14 provide a non-oxidizing atmosphere about the material 22 which is heated thereby on passage of the combustion products upwardly through the openings 32 in the porous hearth 24.

The temperature of the primary combustion chamber 14 may be controlled by varying the percentage of air necessary for complete combustion of the fuel from conduit 74 which is passed through the nozzle 30. Thus to control the temperature in the primary combustion chamber 14 the temperature therein is sensed by the temperature sensing device 64 which produces a signal proportional to the sensed temperature. The signal from the device 64 is then used to control the damper 66 to vary the portion of air from conduit 44 fed to the nozzle 30 and to the perforated air tube 36 by convenient apparatus 68. Many different temperature sensing devices 64, dampers 66 and apparatus 68 for operating the damper 66 from a signal produced by a temperature sensing device 64 are well known, the details thereof will not therefore be included herein.

Thus in starting up of the furnace 10 when the temperature in the primary combustion chamber 14 is low a higher volume of air is fed to nozzle 30 and less of the air passing through valve 70 is passed through tube 36 into chamber 16. As the chamber 14 approaches a set operating temperature however the air-fuel ratio in chamber 14 is decreased by means of the damper 66 and apparatus 68 to provide a cooler flame and maintain a predetermined temperature in chamber 14.

The combustion gases from the primary combustion chamber 14 including partly burned fuel pass into the area of the perforate air tube 36 after heating the material 22 in a non-oxidizing atmosphere where the fuel is again burned with sufficient air to complete burning of the remaining fuel. The secondary combustion of the fuel in the secondary combustion chamber 16 provides a substantial amount of radiant heating of the material 22 without producing an oxidizing atmosphere since the products of the complete combustion of the remaining fuel in the secondary combustion chamber 16 proceed upwardly in the secondary combustion chamber 16 and into the recuperator chamber 18.

The combustion products in both the primary and secondary combustion chambers 14 and 16 proceed upwardly due to the normal tendency of heated gas to ascend and due to the pressure in the eductor stack 46.

During the heating of the material 22 the pressure in the secondary combustion chamber 16 is maintained substantially equal to the pressure outside of the enclosure 12 by varying the pressure in the eductor stack 46 in accordance with the temperature sensed by the temperature sensing device 56 in stack 50. Thus, if the pressure in the secondary combustion chamber 16 becomes too low due to a rapid exhaust of the combustion gases from the secondary combustion chamber 16 through the recuperator 18 and out of the eductor stack 46, which is undesirable in that air would be drawn through opening 20 in the furnace enclosure 12 to provide an oxidizing atmosphere about the material 22 being heated, air will also be drawn into the secondary combustion chamber 16 through the stack 50 and conduit 52 which will produce cooling of the temperature sensing device 56 in stack 50. Cooling of the temperature sensing device 56 will then effect reduction in the air passed from blower 58 into eductor stack 46 by means of apparatus 60 which will raise the pressure in the secondary combustion chamber 16 until it is substantially equal to the pressure exterior of the enclosure 12 to stop air entering into the secondary combustion chamber 16 through openings 20 and 54.

Conversely, if the pressure becomes too high in the secondary combustion chamber 16, the combustion gases within the furnace will pass out of the opening 20 and stack 50 through conduit 52 and opening 54. This is undesirable in that unburned fuel is lost and the air surrounding the furnace is contaminated. The passing of the gases from the enclosure 12 through stack 50 will cause heating of temperature sensitive device 56 which in turn will cause the control apparatus 60 to lower the pressure in eductor stack 46 by controlling blower 58. The pressure in the secondary combustion chamber 16 of the furnace enclosure 12 is thus reduced to prevent escape of the gases from the furnace.

Thus it will be seen that in accordance with the invention there is provided a structure for heating material, such as but not limited to ferrous metals, for forging and forming in a non-oxidizing atmosphere whereby the heated material will be scale free which process and apparatus is particularly simple, economical and efficient. Thus for example, due to the complete combustion of the fuel in the process and structure disclosed forty percent fuel efficiency in scale free heating of material is possible in contrast to many installations presently in use which produce only a ten percent fuel efficiency. Twenty percent fuel efficiency is considered good efficiency for industrial furnaces of the type under consideration.

The particular speed of heating of the structure of the invention is attributed to the provision of the secondary combustion chamber and the consequent heating of the metal from both the top and the bottom thereof with the top heating being by radiation whereby no oxidation of the material is provided even with complete fuel combustion. The efficiency of the process and structure of the invention is attributed to the use of a recuperator and the continued use of a controlled correct fuel-air ratio.

A modification of the furnace structure 10 is illustrated in FIGURE 2. The furnace structure 76 illustrated in FIGURE 2 is different from the furnace structure 10 illustrated in FIGURE 1 in that the apparatus 78 for controlling the pressure in the enclosure 84 has been substituted in the structure 76 for apparatus 48 in structure 10, and the air nozzles 81 have been substituted for the perforated air tube 36.

In all other respects the furnace structure 76 is exactly similar to furnace structure 10.

Apparatus 78 comprises a temperature sensing device 80 positioned over the opening 82 in the furnace enclosure 84 so that furnace gases escaping through opening 82 will vary the temperature of the temperature sensing device 80, the damper 86 for controlling the exhausting of the recuperator chamber 90 and the apparatus 91 for controlling the position of the damper 86 in accordance with the signal provided by the temperature sensing device 80.

The modified apparatus 78 eliminates the necessity for a separate opening 54 in the furnace enclosure 12, the conduit 52 and stack 50 required in the structure of FIGURE 1. In practice it has been found that with a given pressure difference across the opening in the neighborhood of .001" of water, that a temperature difference of fifteen degrees can be produced at the temperature sensing device 80 so that a multitude of commercial temperature sensing devices 80 would provide a signal sufficient to vary the position of the damper and maintain the pressure within the furnace enclosure 84 and exterior thereto substantially equal.

Air nozzles 81 may be substituted for the tube 36 in any installation where the hearth width is not so broad that diffusion of the air therefrom would permit oxidation of material 93.

While one embodiment of the present invention and a single modification thereof has been considered in detail, it will be understood that other embodiments of the invention and modifications thereof, particularly in the structure by which the invention is carried out, are contemplated.

For example, the hearth illustrated in the modifications of the invention shown in FIGURES 1 and 2 need not be a flat porous hearth, as illustrated, but might be a hearth 92 constructed of porous arches 94 having heat transfer material, such as small aluminum oxide balls 96 positioned thereon for receiving material to be heated, as shown in FIGURE 3. Alternatively the hearth may be specially constructed to permit end heating of billets of metal too large to be completely received in the furnace or the hearth may be constructed for pushing bars 98 thereover such as the hearth 100 illustrated in FIGURE 4 wherein the pores 102 are in alignment with and terminate in a V-shaped groove 104. Other hearth constructions, both moving and static, could be used and a plurality of different types of conveyors could be used with the hearth for moving the metal into and out of the furnaces illustrated.

In addition, the tube or tubes 36 of apparatus 10 could be vertical or could extend into the chamber 16 in a plurality of directions and the nozzle 81 in apparatus 76 could be in any wall of the enclosure 84. The critical factor being that air from tube 36 or nozzle 81 should not provide an oxidizing atmosphere for the metal 22 and 93.

Further the apparatus of the invention could be used for heat treating with temperatures in the neighborhood of 1600° F. rather than for heating metal for operations such as but not limited to forming or forging at temperatures in the neighborhood of 2400° F. and the metal heated may be non-ferrous as well as ferrous. Also, it will be noted that the pressure control apparatus 48 and 78 may be used in installations other than the particular furnace structures illustrated in FIGURES 1 and 2.

It is therefore the intention to include all embodiments and modifications of the invention as are defined by the appended claims within the scope of the invention.

What I claim as my invention is:

1. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber and means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation.

2. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation and means positioned adjacent the secondary combustion chamber within the furnace enclosure for preheating the oxygen mixed with the fuel with the combustion product from the secondary combustion chamber.

3. Structure as set forth in claim 2 wherein the means for preheating the oxygen mixed with the fuel comprises a recuperator chamber positioned adjacent the secondary combustion chamber within the furnace enclosure and in communication with the secondary combustion chamber adjacent the top thereof, an oxygen supply conduit passing through the recuperator chamber and means for exhausting gases from the recuperator chamber at a point remote from the secondary combustion chamber.

4. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation, means operably associated with the secondary combustion chamber for maintaining the pressure within the furnace enclosure substantially equal to the pressure exterior of the furnace enclosure and means positioned adjacent the secondary combustion chamber within the furnace enclosure for preheating the metered oxygen that is mixed with the fuel with the combustion product from the secondary combustion chamber.

5. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation, means connected between the metering means and the primary combustion chamber for controlling the temperature within the primary combustion chamber, and means positioned adjacent the secondary combustion chamber within the furnace enclosure for preheating the oxygen mixed with the fuel with the combustion product from the secondary combustion chamber.

6. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the lower primary chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation, means operably associated with the secondary combustion chamber for maintaining the pressure within the furnace enclosure substantially equal to the pressure exterior of the furnace enclosure, means connected between the metering means and the primary combustion chamber for controlling the temperature within the primary combustion chamber and means positioned adjacent the secondary combustion chamber within the furnace enclosure for preheating the oxygen mixed with the fuel with the combustion product from the secondary combustion chamber.

7. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation and means operably associated with the secondary combustion chamber for maintaining the pressure within the furnace enclosure substantially equal to the pressure exterior of the furnace enclosure.

8. Structure as set forth in claim 7 wherein the pressure maintaining means comprises a stack connected into the furnace enclosure, a temperature sensitive device positioned within the stack, eductor means operable to control the exhaust of secondary combustion products from the furnace enclosure and means responsive to said temperature sensitive device for actuating the eductor means.

9. Structure as set forth in claim 7 wherein the pressure maintaining means comprises a temperature sensitive device positioned adjacent an opening in the furnace enclosure, means for regulating the exhaust of combustion products from the secondary combustion chamber and means responsive to the temperature sensitive device for controlling the exhaust regulating means in accordance with the temperature sensed by the temperature sensitive device.

10. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the primary combustion chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation and means connected between the metering means and the primary combustion chamber for controlling the temperature within the primary combustion chamber.

11. Structure as set forth in claim 10 wherein the means for controlling the temperature in the primary combustion chamber comprises a temperature sensitive device positioned in the primary combustion chamber, ratio controlling means operable on actuation to vary the percentage of oxygen mixed with fuel in the primary combustion chamber and means responsive to the temperature sensitive device for actuating the ratio controlling means in accordance with a sensed temperature in the primary combustion chamber.

12. Structure for heating material in a non-oxidizing atmosphere comprising a furnace enclosure, a porous hearth extending transversely of the enclosure dividing the enclosure into a lower primary combustion chamber and an upper secondary combustion chamber, means for metering fuel and between forty and sixty percent of the oxygen necessary to completely burn the fuel into the primary combustion chamber for ignition in the lower primary chamber to heat material placed on the porous hearth, means for drawing the combustion gases of the first burning of the fuel through the porous hearth over the material to be heated and into the secondary combustion chamber, means for introducing sufficient oxygen into the secondary combustion chamber at a location adjacent to but above the material to be heated to complete the combustion of the fuel in the combustion gases from the first burning of the fuel in the primary combustion chamber in the secondary combustion chamber and to heat the material by radiation, means operably associated with the secondary combustion chamber for maintaining the pressure within the furnace enclosure substantially equal to the pressure exterior of the furnace enclosure and means connected between the metering means and the primary combustion chamber for controlling the temperature within the primary combustion chamber.

References Cited by the Examiner

UNITED STATES PATENTS

| | | | |
|---|---|---|---|
| 259,952 | 6/82 | Weber | 40—31 |
| 629,202 | 7/99 | McHenry | 263—17 |
| 1,359,532 | 11/20 | Rockwell | 263—17 |
| 1,848,185 | 3/32 | Mawka | 236—15 |
| 1,931,906 | 10/33 | Smith | 236—15 |
| 2,759,863 | 8/56 | Ness | 263—15 X |
| 2,763,476 | 9/56 | Ness et al. | 263—15 X |
| 2,844,365 | 7/58 | Rusciano. | |
| 2,845,260 | 7/58 | Rusciano | 266—5 |
| 2,886,303 | 5/59 | Rusciano | 263—15 X |
| 3,022,057 | 2/62 | Schmidt et al. | 263—15 |

FOREIGN PATENTS 641,711  8/50  Great Britain.

CHARLES SUKALO, *Primary Examiner.*

JOHN J. CAMBY, *Examiner.*